(12) United States Patent
Slack et al.

(10) Patent No.: US 10,436,181 B2
(45) Date of Patent: Oct. 8, 2019

(54) SYSTEM AND METHOD FOR DETERMINING AN ESTIMATED POSITION OF A WIND TURBINE ROTOR SHAFT

(71) Applicant: General Electric Company, Schenectady, NY (US)

(72) Inventors: Robert Peter Slack, Seattle, WA (US); Mark Edward Cardinal, Altamont, NY (US)

(73) Assignee: General Electric Company, Schenectady, NY (US)

(*) Notice: Subject to any disclaimer, the term of this patent is extended or adjusted under 35 U.S.C. 154(b) by 317 days.

(21) Appl. No.: 15/434,212

(22) Filed: Feb. 16, 2017

(65) Prior Publication Data

US 2018/0230970 A1 Aug. 16, 2018

(51) Int. Cl.
*F03D 17/00* (2016.01)
*F03D 7/04* (2006.01)

(52) U.S. Cl.
CPC .............. *F03D 17/00* (2016.05); *F03D 7/042* (2013.01); *F05B 2240/60* (2013.01); *F05B 2270/326* (2013.01); *F05B 2270/807* (2013.01); *Y02E 10/721* (2013.01)

(58) Field of Classification Search
CPC ...... F03D 7/042; F03D 17/00; F05B 2240/60; Y02E 10/721
See application file for complete search history.

(56) References Cited

U.S. PATENT DOCUMENTS

| | | | |
|---|---|---|---|
| 7,972,112 B2 | 7/2011 | Melius | |
| 8,033,788 B2* | 10/2011 | Egedal | F03D 7/0292 416/43 |
| 8,070,439 B2 | 12/2011 | Melius | |
| 8,092,174 B2 | 1/2012 | Egedal | |
| 8,246,304 B2 | 8/2012 | Egedal | |
| 8,327,710 B2* | 12/2012 | Koste | F03D 80/30 416/61 |
| 8,334,608 B2 | 12/2012 | Pechlivanoglou et al. | |

(Continued)

FOREIGN PATENT DOCUMENTS

EP 1959127 A2 8/2008
WO WO 2009/001310 A1 12/2008

*Primary Examiner* — Patrick Hamo
*Assistant Examiner* — Joseph S. Herrmann
(74) *Attorney, Agent, or Firm* — Dority & Manning, P.A.

(57) ABSTRACT

The present disclosure is directed to a method for determining an estimated rotor shaft position of a rotor shaft of a wind turbine. The method includes generating, with a rotor shaft position sensor, a measured rotor shaft position signal associated with a measured rotor shaft position of the rotor shaft. The method also includes generating, with a plurality of accelerometers positioned in an axisymmetric arrangement, a plurality of rotor hub acceleration signals associated with a plurality of rotor hub accelerations of a rotor hub coupled to the rotor shaft. The method further includes determining, with a controller, a phase adjustment based on one of the plurality of rotor hub acceleration signals or a predetermined correction value. Furthermore, the method includes adjusting, with the controller, the measured rotor shaft position by the phase adjustment to determine the estimated rotor shaft position of the rotor.

19 Claims, 6 Drawing Sheets

(56) References Cited

U.S. PATENT DOCUMENTS

| | | | |
|---|---|---|---|
| 8,434,996 B2 * | 5/2013 | Bagepalli | G01M 5/0016 |
| | | | 415/14 |
| 8,649,911 B2 * | 2/2014 | Avagliano | F03D 7/028 |
| | | | 290/44 |
| 8,831,907 B2 * | 9/2014 | Bertolotti | G01B 21/22 |
| | | | 702/151 |

* cited by examiner

SYSTEM AND METHOD FOR DETERMINING AN ESTIMATED POSITION OF A WIND TURBINE ROTOR SHAFT

FIELD

The present disclosure generally relates to wind turbines. More particularly, the present disclosure relates to systems and methods for determining estimated positions of wind turbine rotor shafts.

BACKGROUND

Wind power is considered one of the cleanest, most environmentally friendly energy sources presently available, and wind turbines have gained increased attention in this regard. A modern wind turbine typically includes a tower, a nacelle mounted on the tower, a generator positioned in the nacelle, and one or more rotor blades. The one or more rotor blades convert kinetic energy of wind into mechanical energy using known airfoil principles. A drivetrain transmits the mechanical energy from the rotor blades to the generator. The generator then converts the mechanical energy to electrical energy that may be supplied to a utility grid.

The drivetrain may include a rotor shaft, a gearbox, and a generator shaft. More specifically, the rotor shaft may rotatably couple the rotor blades to the gearbox. The generator shaft may rotatably couple the gearbox to the generator. In this respect, the rotor blades may cause the rotor shaft to rotate. The rotation of the rotor shaft, in turn, drives the gearbox, generator shaft, and the generator.

Various sensors may be used to determine an estimated rotational position of the rotor shaft or other rotating components of the drivetrain. For example, a position sensor, such as an incremental or absolute encoder, may generate a signal associated with the position of the rotor shaft. The position sensor, however, may not be aligned with the phase of the rotor shaft, thereby providing an inaccurate estimation of the rotor shaft position. For example, the position sensor is not aligned with the correct phase of the rotor shaft if the position sensor is operatively coupled to the generator shaft. Furthermore, even if the position sensor is operatively coupled to the rotor shaft, the position sensor may easily be misaligned with the phase of the rotor shaft during installation. Alternatively, accelerometers may also be used to estimate the position of the rotor shaft. The signals generated by the accelerometers may, however, include significant noise, which may result in relatively inaccurate estimations of the rotor shaft position.

Accordingly, improved wind turbines, and, in particular, improved systems and methods for determining the estimated position of the rotor shaft of the wind turbine, are desired in the art. Specifically, systems and methods that produce relatively more accurate estimations of the position of the rotor shaft of the wind turbine would be advantageous.

BRIEF DESCRIPTION

Aspects and advantages of the technology will be set forth in part in the following description, or may be obvious from the description, or may be learned through practice of the technology.

In one embodiment, the present disclosure is directed to a method for determining an estimated rotor shaft position of a rotor shaft of a wind turbine. The method includes generating, with a rotor shaft position sensor, a measured rotor shaft position signal associated with a measured rotor shaft position of the rotor shaft. The method also includes generating, with a plurality of accelerometers positioned in an axisymmetric arrangement, a plurality of rotor hub acceleration signals associated with a plurality of rotor hub accelerations of a rotor hub coupled to the rotor shaft. The method further includes determining, with a controller, a phase adjustment based on one of the plurality of rotor hub acceleration signals or a predetermined correction value. Furthermore, the method includes adjusting, with the controller, the measured rotor shaft position by the phase adjustment to determine the estimated rotor shaft position of the rotor.

In another embodiment, the present disclosure is directed to a system for determining an estimated rotor shaft position of a rotor shaft of a wind turbine. The system includes a rotor shaft and a rotor hub coupled to the rotor shaft. A rotor shaft position sensor operatively couples to the rotor shaft for detecting a measured rotor shaft position of the rotor shaft and generating a measured rotor shaft position signal associated with a measured rotor shaft position. A plurality of accelerometers operatively couples to the rotor hub and is positioned in an axisymmetric arrangement about the rotor shaft. The plurality of accelerometers measures a plurality of rotor hub accelerations of the rotor hub and generates a plurality of rotor hub acceleration signals associated with the plurality of rotor hub accelerations. A controller communicatively couples to the rotor shaft position sensor and the plurality of accelerometers. The controller is configured to determine a phase adjustment based on one of the plurality of rotor hub acceleration signals or a predetermined correction value. The controller is also configured to adjust the measured rotor shaft position by the phase adjustment to determine the estimated rotor shaft position of the rotor.

In a further embodiment, the present disclosure is directed to a wind turbine. The wind turbine includes a tower, a nacelle mounted on the tower, and a rotor shaft at least partially positioned in the nacelle. A rotor hub couples to the rotor shaft. A plurality of rotor blades couples to the rotor hub. A rotor shaft position sensor operatively couples to the rotor shaft for detecting a measured rotor shaft position of the rotor shaft and generating a measured rotor shaft position signal associated with a measured rotor shaft position. A plurality of accelerometers operatively couples to the rotor hub and is positioned in an axisymmetric arrangement about the rotor shaft. The plurality of accelerometers measures a plurality of rotor hub accelerations of the rotor hub and generates a plurality of rotor hub acceleration signals associated with the plurality of rotor hub accelerations. A controller communicatively couples to the rotor shaft position sensor and the plurality of accelerometers. The controller is configured to determine an estimated rotor shaft position of the rotor shaft based on the measured rotor shaft position signal and the plurality of rotor hub acceleration signals.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
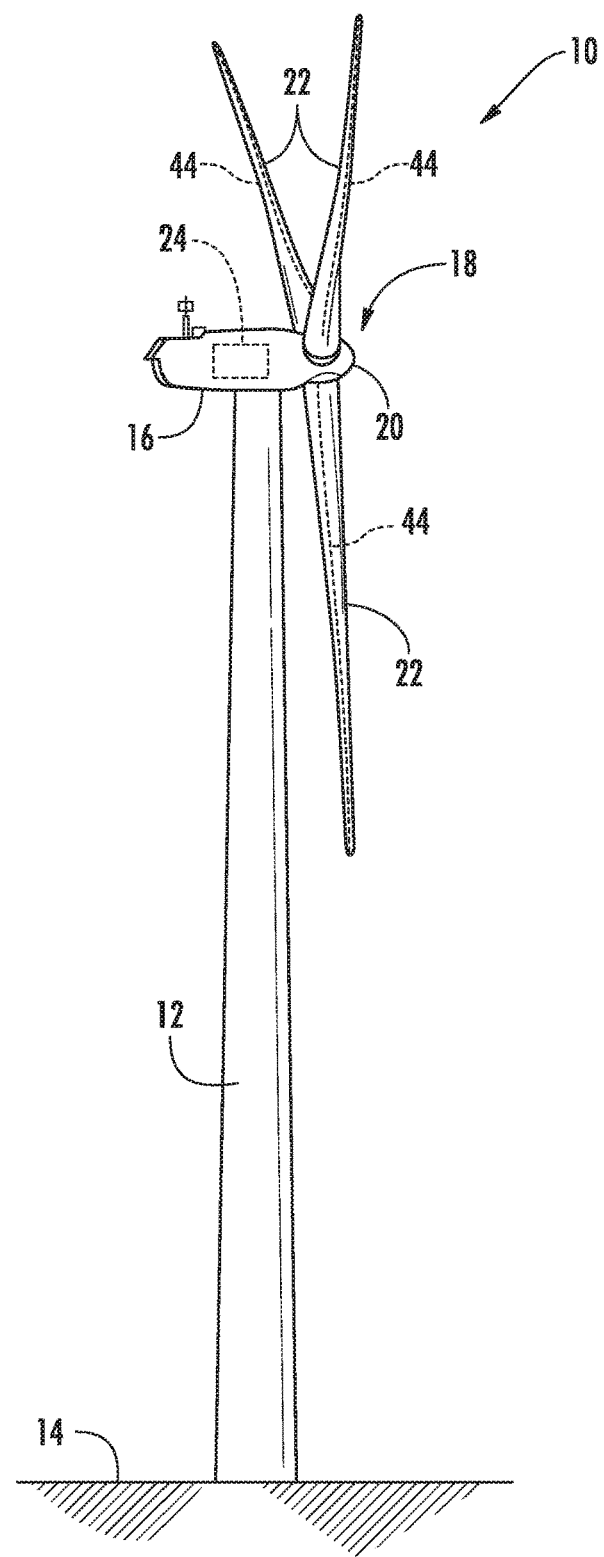
FIG. 1 is a perspective view of an exemplary wind turbine in accordance with embodiments of the present disclosure.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Referring now to the drawings, FIG. 1 illustrates a perspective view of one embodiment of an exemplary wind turbine 10 in accordance with the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotor hub 20 and at least one rotor blade 22 coupled to and extending outwardly from the hub 20. For example, in the embodiment shown in FIG. 1, the rotor 18 includes three rotor blades 22. In alternative embodiments, however, the rotor 18 may include more or less than three rotor blades 22. Each rotor blade 22 may be spaced about the hub 20 to facilitate rotating the rotor 18 to convert kinetic energy from the wind into usable mechanical energy, and subsequently, electrical energy. For instance, the hub 20 may be rotatably coupled to an electric generator 24 positioned within the nacelle 16.

Figure 2:
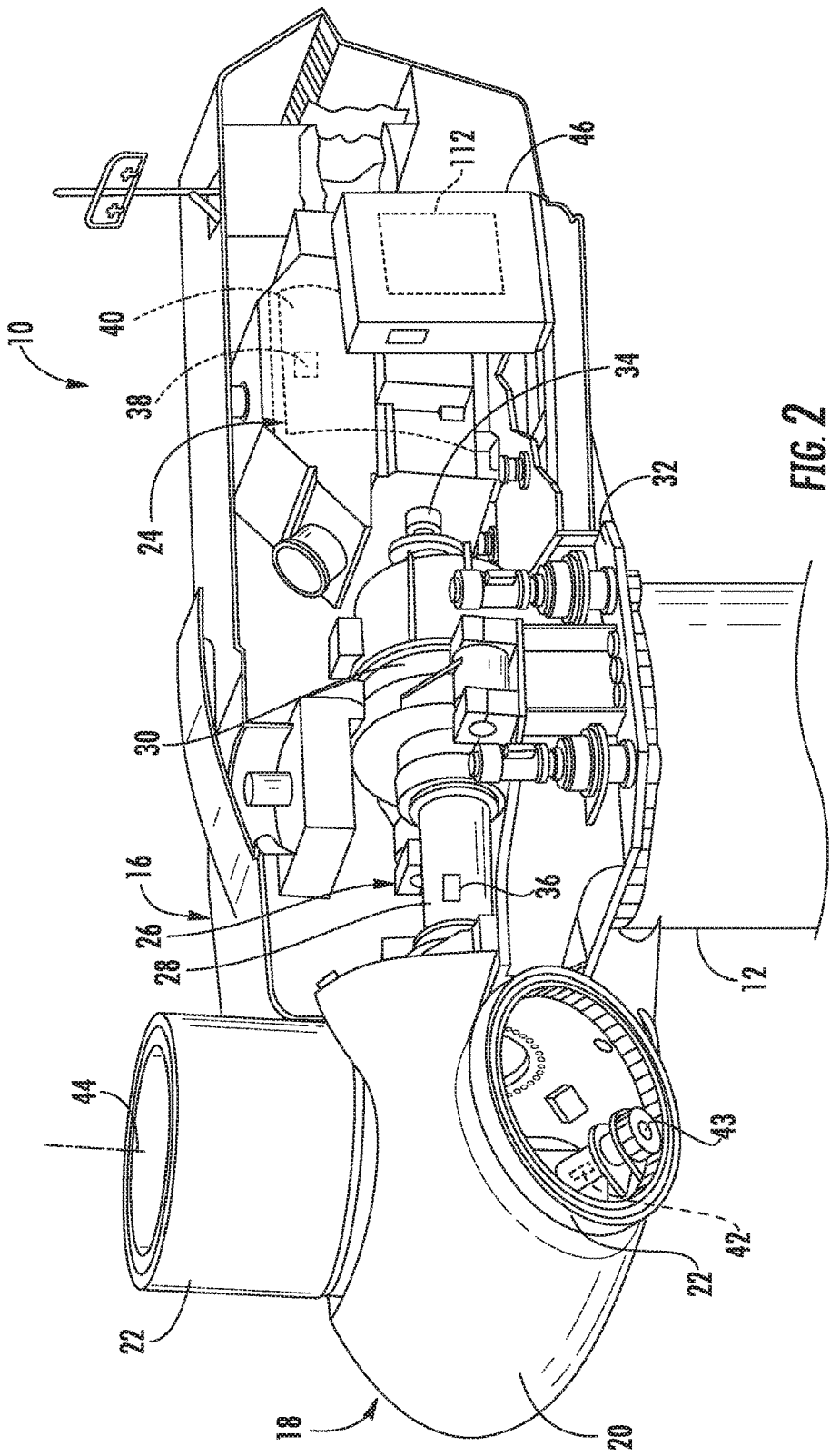
FIG. 2 is a perspective, internal view of a nacelle of a wind turbine according to one embodiment of the present disclosure.

Referring now to FIG. 2, a drivetrain 26 rotatably couples the rotor 18 to the electric generator 24. As shown, the drivetrain 26 may include a rotor shaft 28 that rotatably couples the hub 20 of the rotor 18 to a gearbox 30. The gearbox 30 may be supported by and coupled to a bedplate 32 in the nacelle 16. The drivetrain 26 may also include a generator shaft 34 that rotatably couples the gearbox 30 to the generator 24. In this respect, rotation of the rotor 18 drives the generator 24. More specifically, rotor shaft 28 may provide a low speed, high torque input to the gearbox 30 in response to rotation of the rotor blades 22 and the hub 20. The gearbox 30 may then convert the low speed, high torque input to a high speed, low torque output to drive the generator shaft 34 and, thus, the generator 24. In alternate embodiments, however, the generator 24 may be directly rotatably coupled to the rotor shaft 28 in a direct-drive configuration.

Various rotational position sensors may operatively couple to the drivetrain 26. As shown in FIG. 2, the wind turbine 10 may include a rotor shaft position sensor 36 operatively coupled to the rotor shaft 28 to detect a rotational position thereof. The wind turbine 10 may also include a generator shaft position sensor 38 to detect a rotational position of the generator shaft 34. In the embodiment shown in FIG. 2, the generator shaft position sensor 38 is operatively coupled to a generator rotor 40 of the generator 24. In alternate embodiments, however, the generator shaft position sensor 38 may be operatively coupled to the generator shaft 34. In certain embodiments, the wind turbine 10 may include only one of the rotor shaft position sensor 36 or the generator shaft position sensor 38. Furthermore, the wind turbine may include additional rotational position sensors operatively coupled to the drivetrain 26 to detect the rotor shaft and/or generator shaft positions when communication with the sensors 36, 38 fails.

The sensors 36, 38 may be any suitable sensors that detect rotational position. In exemplary embodiments, the sensors 36, 38 may be incremental rotary encoders. More specifically, the rotor shaft 28, the generator shaft 34, and/or the generator rotor 40 may include a plurality of annularly arranged features, such as axisymmetrically arranged features, disposed thereon or coupled thereto. For example, the features may be positioned on a disc coupled to the rotor or the generator shafts 28, 34. The features may be teeth, marks, bolt heads, or any other suitable group of annularly arranged projections. As the drivetrain 26 powers the generator 24, each feature rotates into and out of alignment with the sensors 36, 38 one time for every revolution of the rotor shaft 36, the generator shaft 38, and/or the generator rotor 40. Each time this occurs, the sensors 36, 38 generate an electric pulse. As will be discussed in greater detail below, the number of electric pulses, which may be arranged in quadrature to sense direction, may be used to determine the rotational positions of the shafts 28, 34. In alternate embodiments, the sensors 36, 38 may be absolute rotary encoders or any other suitable rotational position sensors. In further embodiments, the sensors 36, 38 may detect a rotational speed of the shafts 28, 34, which may be used to determine the rotational position of the shafts 28, 34.

Figure 3:
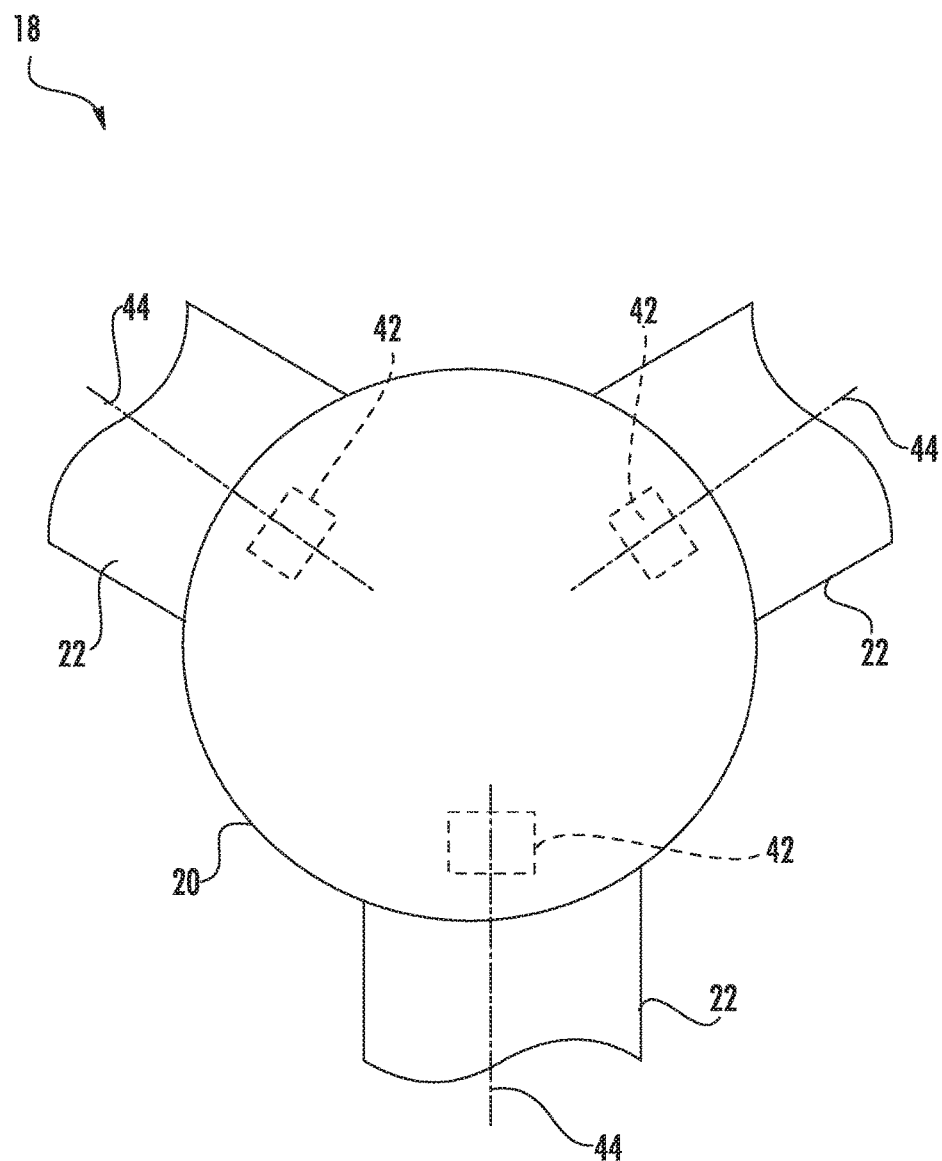
FIG. 3 is a front view of a rotor of a wind turbine according to one embodiment of the present disclosure.

Referring to FIGS. 2 and 3, the wind turbine 10 further includes a plurality of accelerometers 42. In the embodiment shown in FIG. 3, the wind turbine 10 includes three accelerometers 42. Each accelerometer 42 may be positioned on or in one of the rotor hub 20, such as within a pitch adjustment mechanism 43 or a pitch adjustment box. In this respect, each accelerometer 42 may be associated with one a pitch axis 44 (FIG. 1) of one of the rotor blades 22. In alternate embodiments, the wind turbine 10 may include more or fewer accelerometers 42. Furthermore, the accelerometers 42 may be positioned on or within other rotating components of the wind turbine 10 (e.g., spokes coupled to the rotor shaft 28) so long as the accelerometers 42 are positioned radially outward from the rotor shaft 28.

In the embodiment shown in FIG. 1, each accelerometer 42 is associated with and positioned along a pitch axis 44 of one of the rotor blades 22. In this respect, the accelerometers 42 are axisymmetrically arranged about the rotor 18 and positioned radially outward from the hub 20 and the rotor shaft 28. As such, the accelerometers 42 are positioned in a plane perpendicular to the length of the rotor shaft 28. In alternate embodiments, the accelerometers 42 may be axisymmetrically positioned along a different set of axes extending radially outward from the rotor shaft 28, such as axes that are circumferentially offset from the pitch axes 44.

In exemplary embodiments, the accelerometers 42 are uniaxial accelerometers. In such embodiments, each accelerometer 42 detects an acceleration of the hub 20 in a single direction at its corresponding location. As mentioned above, the accelerometers 42 may be positioned in the hub 20 along the pitch axes 44 of the rotor blades 22. In this respect, the accelerometers 42 may be oriented such that each accelerometer 42 measures an acceleration of the hub 20 in a direction perpendicular to the corresponding pitch axis 44. In certain instances, each accelerometer 42 may measure an acceleration of the hub 20 in a direction slightly offset from being perpendicular to the corresponding pitch axis 44 based on reasonable manufacturing tolerance and/or a coning angle. As will be discussed in greater detail below, the axisymmetric arrangement of three uniaxial accelerometers allows various rotational components of the measured accelerations to be removed. In alternate embodiments, the accelerometers 42 may detect accelerations in directions oriented at non-perpendicular angles to the pitch axes 44 of the rotor blades 22. In further embodiments, the accelerometers 42 may be biaxial or triaxial accelerometers. In such embodiments, it may be that only one directional output signal of each biaxial or triaxial accelerometer may be used.

Figure 4:
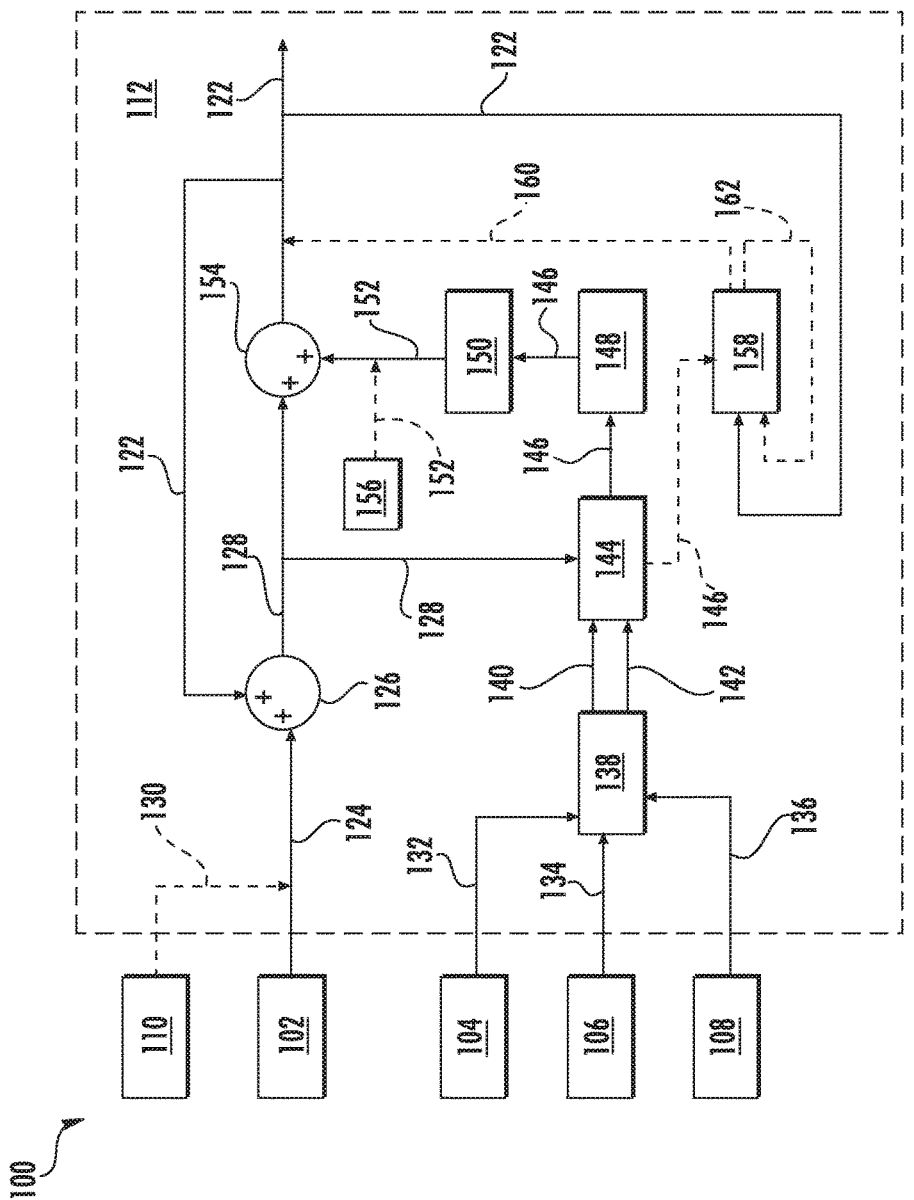
FIG. 4 is a schematic view of a system for determining an estimated position of a rotor shaft of a wind turbine according to one embodiment of the present disclosure.

FIG. 4 illustrates a system 100 for determining an estimated position of the rotor shaft 28 of the wind turbine 10. The estimated position of the rotor shaft 28 is the estimated rotational position of the rotor shaft 28 about it longitudinal axis. As will be discussed in greater detail below, the system 100 adjusts measured position of the rotor shaft 28 (e.g., as detected by the rotor position sensor 36) by a phase adjustment to determine the estimated position of the rotor shaft 28.

As shown, the system 100 includes a rotor shaft position sensor 102 for detecting a position of the rotor shaft 28. In some embodiments, the rotor shaft position sensor 102 may correspond to the rotor shaft position sensor 36 shown in FIG. 2. In alternate embodiments, the rotor shaft position sensor 102 may correspond to generator shaft position sensor 38 shown in FIG. 2. In such embodiments, the position of the rotor shaft 28 may be determined based on the position of the generator shaft 38 and a gear ratio of the gearbox 30. In further embodiments, the rotor shaft position sensor 102 may correspond to other sensors not shown in FIG. 2.

The system 100 also includes a plurality of accelerometers. In the embodiment shown in FIG. 4, the system 100 includes a first accelerometer 104, a second accelerometer 106, and a third accelerometer 108. In some embodiments, the first, second, and third accelerometers 104, 106, 108 may correspond to one of the accelerometers 42 shown in FIG. 2. As such, the first, second, and third accelerometers 104, 106, 108 may detect the acceleration of the hub 20 at its respective location within the hub 20. In alternate embodiments, the accelerometers 104, 106, 108 may correspond to other sensors not shown in FIG. 2. Furthermore, the system 100 may include more or fewer accelerometers.

In some embodiments, such as the one shown in FIG. 4, the system 100 may include an alternate rotational position sensor 110. In particular, the alternate rotational position sensor 110 may correspond to one of the rotor shaft position sensor 36 or the generator shaft position sensor 38. In some embodiments, for example, the rotor shaft position sensor 102 may correspond to the rotor shaft position sensor 36, while the alternate rotor shaft position sensor 110 may correspond to the generator shaft position sensor 38. The alternate rotor shaft position sensor 110 may be less accurate than the rotor shaft position sensor 102 in some embodiments. In alternate embodiments, however, the rotor shaft position sensor 102 may correspond to the generator shaft position sensor 38, while the alternate rotor shaft position sensor 110 may correspond to the rotor shaft position sensor 36. In further embodiments, the alternate rotor shaft position sensor 110 may correspond to other sensors not shown in FIG. 2.

The system 100 further includes a controller 112 communicatively coupled to one or more components of the system 100 and/or the wind turbine 10, such as the sensors 102, 110 and the accelerometers 104, 106, 108. In the embodiment shown in FIG. 2, for example, the controller 112 is disposed within a control cabinet 46 mounted to a portion of the nacelle 16. In alternate embodiments, however, the controller 112 may be disposed at any location on or in the wind turbine 10, at any location on the support surface 14, or any other suitable location.

Figure 5:
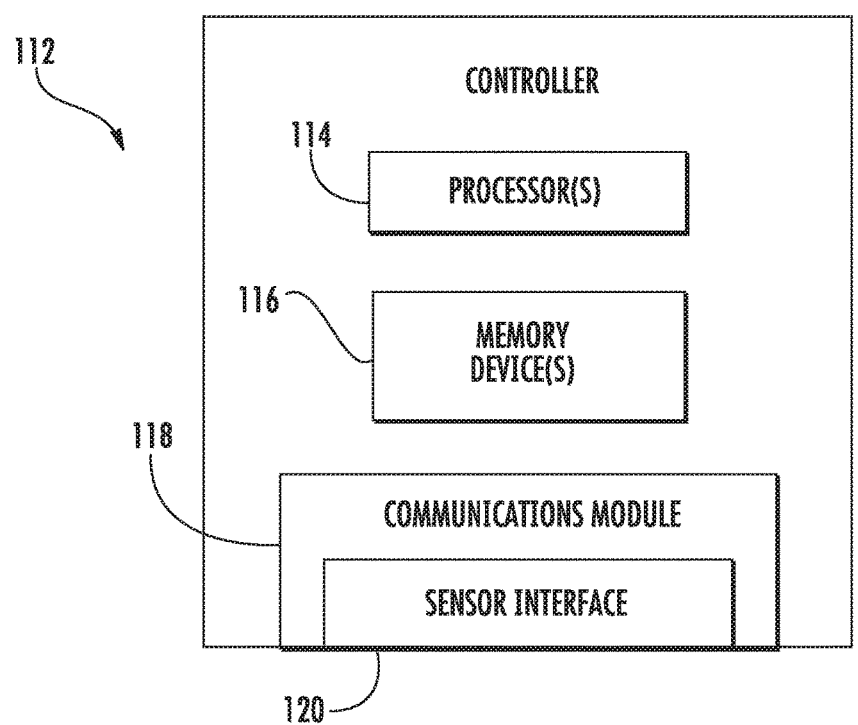
FIG. 5 is a schematic view of a controller of a system for determining an estimated position of a rotor shaft of a wind turbine according to one embodiment of the present disclosure.

In general, the controller 112 may correspond to any suitable processor-based device, including one or more computing devices. As shown in FIG. 5, for example, the controller 112 may include one or more processors 114 and one or more associated memory devices 116 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory devices 116 may generally include memory element(s) including, but not limited to, a computer readable medium (e.g., random access memory (RAM)), a computer readable non-volatile medium (e.g., flash memory), a compact disc-read only memory (CD-ROM), a magneto-optical disk (MOD), a digital versatile disc (DVD), and/or other suitable memory elements or combinations thereof. The memory device 116 may store instructions that, when executed by the processor 114, cause the processor 114 to perform functions (e.g., the method described herein).

The controller 112 may also include a communications module 118 to facilitate communications between the controller 112 and the various components of the system 100 and/or the wind turbine 10. For example, the communications module 118 may permit the controller 112 to receive data from the sensors 102, 110 and the accelerometers 104, 106, 108. As such, the communications module 118 may include a sensor interface 120 (e.g., one or more analog-to-digital converters) that converts the signals received from the sensors 102, 110 and the accelerometers 104, 106, 108 into signals that can be understood and processed by the processors 114. In this respect, the communications module 118 may be any combination of suitable wired and/or wireless communication interfaces that communicatively couple the sensors 102, 110 and the accelerometers 104, 106, 108 to the controller 112.

Referring again to FIG. 4, the controller 112 may be configured to determine the estimated position of the rotor shaft 28 by executing logic stored on the memory device(s) 116. In particular, the controller 112 (e.g., via the processor(s) 114) executes the logic to generate an estimated rotor shaft position signal 122 associated with the estimated position of the rotor shaft 28. The estimated position signal 122 is based various combinations of the data received from the sensors 102, 110 and the accelerometers 104, 106, 108.

As mentioned above, the controller 112 is communicatively coupled to the rotor shaft position sensor 102. In this respect, the controller 112 may receive an incremental measured rotor shaft position signal 124 generated by the rotor shaft position sensor 102. The incremental measured rotor shaft position signal 124 is associated with the incremental position or an incremental movement of the rotor shaft 28 as measured by the rotor shaft position sensor 102. The incremental measured position of the rotor shaft 28 is the current measured position of the rotor shaft 28 relative to a previous measured position of the rotor shaft 28. Movement of the nacelle 16 relative to the support surface 14 (e.g., due to wind) may impart error into the accelerations detected by 104, 106, 108 which in the absence of nacelle motion will respond primarily to the effective acceleration of the gravity field.

The controller 112 may be configured to convert the incremental measured rotor shaft position into an incrementally updated rotor shaft position of the rotor shaft 28. The incrementally updated position of the rotor shaft 28 is the current measured position of the rotor shaft 28 relative to a fixed (i.e., non-rotating) reference point. As such, the incrementally updated position is not an incremental position or movement and is not related to any error or phase correction associated with the estimated position of the rotor shaft 28. In this respect, the controller 112 may include a summation block 126. By executing the summation block 126, the controller 112 sums the incremental measured rotor shaft position signal 124 and the estimated rotor shaft position signal 122. That is, the controller 112 adds the current incremental position of the rotor shaft 28 to the previous actual position of the rotor shaft 28. As such, the controller 112 creates an incrementally updated estimated position signal 128 associated with the incrementally updated position of the rotor shaft 28. In alternate embodiments, the controller 112 may receive the incrementally updated estimated position signal 128 directly from the rotor shaft position sensor 102.

In certain embodiments, the controller 112 may receive an alternate incremental measured rotor shaft position signal 130 from the alternate rotor shaft position sensor 110. In such embodiments, the controller 112 may use the alternate incremental measured rotor shaft position signal 130 when the controller 112 fails to receive the incremental measured rotor shaft position signal 124. This may occur when, for example, the controller 112 loses communication with the rotor shaft position sensor 102. In some embodiments, however, the controller 112 may not receive the alternate incremental measured rotor shaft position signal 130.

The controller 112 is also communicatively coupled to the first, second, and third accelerometers 104, 106, 108. In this respect, the controller 112 receives a first hub acceleration signal 132 generated by the first accelerometer 104 associated with an acceleration of the hub 20 at the position of the first accelerometer 104. The controller 112 also receives a second hub acceleration signal 134 generated by the second accelerometer 106 associated with an acceleration of the hub 20 at the position of the second accelerometer 106. The controller 112 further receives a third hub acceleration signal 136 generated by the third accelerometer 108 associated with an acceleration of the hub 20 at the position of the third accelerometer 108. The first, second, and third rotor blade accelerations are in a rotating frame of reference.

The controller 112 may be configured to determine an acceleration of the rotor shaft 28 based on the first, second, and third hub acceleration signals 132, 134, 136. In this respect, the controller 112 may include rotor shaft acceleration logic 138 having one or more mathematical functions and/or one or more look-up tables. By executing the rotor shaft acceleration logic 138, the controller 112 may optionally convert the first, second, and third rotor blade acceleration signals 132, 134, 136 into first and second rotor shaft acceleration signals 140, 142. The first and second rotor shaft acceleration signals 140, 142 are associated with the first and second accelerations of the rotor shaft 28. The first and second rotor shaft accelerations may be the accelerations experienced by the rotor shaft 28 in first and second directions. In certain embodiments, the first and second directions are orthogonal. The first and second rotor shaft accelerations are in a rotating frame of reference. In alternate embodiments, the controller 112 may generate more or fewer rotor shaft acceleration signals.

The controller 112 generates the first and second rotor shaft acceleration signals 140, 142 by removing any rotational acceleration components from of the first, second, and third acceleration signals 132, 134, 136. For example, making a vector combination of the three axisymmetric uniaxial acceleration signals 132, 134, 136, which have known directions, inherently cancels any rotational acceleration components that affect all three equally. The rotational acceleration components may include centripetal and/or tangential accelerations. As mentioned above, the axisymmetric arrangement of the three accelerometers 104, 106, 108 allows removal of the rotational components of the acceleration signals 132, 134, 136. More specifically, the rotational components in each rotor blade acceleration signal 132, 134, 136 measured by the three axisymmetrically arranged accelerometers 104, 106, 108 have the same magnitude, but are oriented in a different direction. Since the orientations of the accelerometers 104, 106, 108 are known, the controller 112 may remove the rotational components of the acceleration signals 132, 134, 136 by executing the rotor shaft acceleration logic 138, which may include making a vector combination.

The controller 112 may be configured to determine an acceleration of the rotor shaft 28 relative to a fixed reference frame based on the first and second rotor shaft acceleration signals 140, 142 and the incrementally updated estimated position signal 128. In this respect, the controller 112 may include coordinate transformation acceleration logic 144 having one or more mathematical functions and/or one or more look-up tables. By executing the coordinate transformation logic 138, the controller 112 may convert the first and second rotor shaft acceleration signals 140, 142 into an estimated fixed frame of reference rotor shaft acceleration signal 146. The estimated fixed frame of reference rotor shaft acceleration signal 146 is associated with the acceleration of the rotor shaft 28 relative to a fixed reference frame, such as the nacelle 16 when the estimated position is substantially correct. In alternate embodiments, the controller 112 may generate more or fewer estimated fixed frame of reference rotor shaft acceleration signals.

In particular embodiments, the estimated fixed frame of reference rotor shaft acceleration signal 146 is the acceleration of the rotor shaft 28 in the direction that should be horizontal according to the incrementally updated estimated position signal 128. When the estimated rotor shaft position signal 122 includes some phase error, then the incrementally updated estimated position signal 128 may also include this phase error. As such, the estimated fixed frame of reference rotor shaft acceleration may not truly be a horizontal fixed frame acceleration. Since it is not truly horizontal, the estimated fixed frame of reference rotor shaft acceleration may be out of alignment with the gravity field. As such, the estimated fixed frame of reference rotor shaft acceleration will contain some component of apparent acceleration due to gravity, which becomes an effective positive or negative error signal that feeds back to influence the estimated rotor shaft position signal 122 via the phase adjustment 152.

In the embodiment shown in FIG. 3, the controller 112 includes a filter 148 for removing noise from the estimated fixed frame of reference rotor shaft acceleration signal 146. For example, the filter 148 may be a notch filter that removes noise caused by lateral accelerations of the nacelle 16 when the tower 12 is near its natural frequency. In alternate embodiments, the filter 148 may be a low pass filter or any other suitable type of filter. Furthermore, the filter 148 may remove any noise from the estimated fixed frame of reference rotor shaft acceleration signal 146. In some embodiments, the controller 112 may not include the filter 148.

The controller 112 is also configured to determine a phase adjustment for adjusting the incrementally updated position of the rotor shaft 28. In this respect, the controller 112 may include phase adjustment logic 150 having one or more mathematical functions and/or one or more look-up tables. In some embodiments, for example, the phase adjustment logic 150 may include proportional, integral, and/or derivative gain blocks. By executing the phase adjustment logic 150, the controller 112 may convert the estimated fixed frame of reference rotor shaft acceleration signal 146 into a phase adjustment signal 152. The phase adjustment signal 152 is associated with the phase adjustment needed to adjust the incrementally updated position of the rotor shaft 28 to the estimated position of the rotor shaft 28. Specifically, the phase adjustment compensates for the error in the incremental measured position of the rotor shaft 28 associated with phase misalignment between the rotor shaft 28 and the rotor shaft position sensor 102 and/or the alternate rotor shaft position sensor 110. In this respect, the phase adjustment may be based on the plurality of hub acceleration signals 132, 134, 136.

The controller 112 may be configured to determine the estimated position of the rotor shaft 28 based on the incrementally updated position of the rotor shaft 28 and the phase adjustment. In this respect, the controller 112 may include a summation block 154. By executing the summation block 154, the controller 112 sums the incrementally updated estimated position signal 128 and the phase adjustment signal 152. That is, the controller 112 adds the phase adjustment to the incrementally updated position of the rotor shaft 28. As such, the controller 112 creates the estimated rotor shaft position signal 122 associated with the estimated position of the rotor shaft 28. In this respect, the estimated position of the rotor shaft 28 is free from error caused by phase misalignment between the rotor shaft 28 and the rotor shaft position sensor 102 and/or the alternate rotor shaft position sensor 110.

In some instances, the controller 112 may not receive the acceleration signals 132, 134, 136 from the accelerometers 104, 106, 108. This may occur when, for example, the controller 112 loses communication with the accelerometers 104, 106, 108. In such instances, the controller 112 is unable to determine the correction factor based on the acceleration signals 132, 134, 136 as described above. When this occurs, the controller 112 may be configured to determine the estimated position of the rotor shaft 28 based on the previous estimated position of the rotor shaft 28, the incremental measured position of the rotor shaft 28, and a predetermined correction value 156. More specifically, when the controller 112 fails to receive the acceleration signals 132, 134, 136, the controller 112 generates the phase adjustment signal 152 such that the phase adjustment signal 152 is associated with the predetermined correction value 156. In this respect, the controller 112, when executing the summation block 154, adds the predetermined correction value 156 to the incrementally updated position of the rotor shaft 28 to determine the estimated position of the rotor shaft 28.

In some embodiments, the predetermined correction value 156 is zero. In such embodiments, the controller 112 does not adjust the incrementally updated estimated position signal 128 when generating the estimated rotor shaft position signal 122. Accordingly, the estimated and incrementally updated positions of the rotor shaft 28 are the same. In alternate embodiments, the predetermined correction value 156 may be a non-zero number. The predetermined correction value 156 may be stored in the memory device 116.

In certain instances, the controller 112 may not receive the incremental measured rotor shaft position signal 124 from the rotor shaft position sensor 102. This may occur when, for example, the controller 112 loses communication with the rotor shaft position sensor 102 and, when included, the alternate rotor shaft position sensor 110. In such instances, the controller 112 is unable to determine the estimated position of the rotor shaft 28 based on the incremental measured rotor shaft position signal 124 as described above.

When this occurs, the controller 112 may be configured to determine an updated estimated position of the rotor shaft 28 based on the plurality of hub acceleration signals 132, 134, 136 and the estimated rotor shaft position signal 122. In this respect, the controller 112 may include phase locked loop logic 158 having one or more mathematical functions that define a phase locked loop. The phase locked loop logic 158 may receive the estimated rotor shaft position signal 122 and the estimated fixed frame of reference rotor shaft acceleration signal 146 when the controller 112 receives the incremental measured rotor shaft position signal 124. When the controller 112 does not receive the incremental measured rotor shaft position signal 124, the controller 112 may then execute the phase locked loop logic 158. By executing the phase locked loop logic 158, the controller 112 may generate the updated estimated rotor shaft position signal 160 based the estimated rotor shaft position signal 122 and the estimated fixed frame of reference rotor shaft acceleration signal 146. The updated estimated rotor shaft position signal 160 is associated with the updated estimated position of the rotor shaft 28. The updated estimated position of the rotor shaft 28 is the estimated position of the rotor shaft 28 updated include changes therein occurring after the controller 112 stops receiving the incremental measured rotor shaft position signal 124. In some embodiments, the controller 112 may generate a rotor shaft speed signal 162 associated with a rotor shaft speed of the rotor shaft 28 when executing the phase locked loop logic 158.

Figure 6:
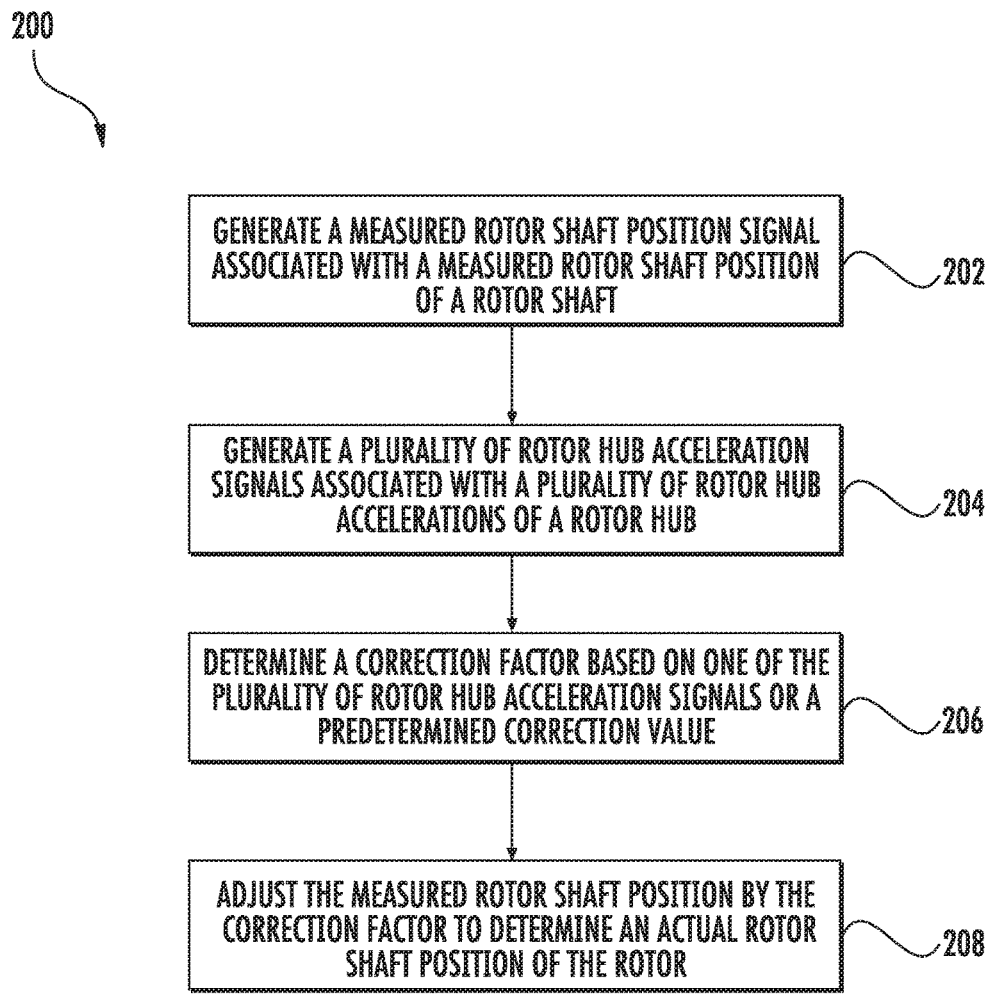
FIG. 6 is a flow chart illustrating a method for determining an estimated position of a rotor shaft of a wind turbine according to one embodiment of the present disclosure.

FIG. 6 illustrates a method 200 for determining the estimated position of the rotor shaft 28 of the wind turbine 10 in accordance with embodiments of the present disclosure.

In step 202, the measured rotor shaft position signal 124 associated with the measured position of the rotor shaft 28 is generated. For example, the rotor shaft position sensor 102 may generate the measured rotor shaft position signal 124. In some embodiments, the alternate rotor shaft position sensor 110 may generate the alternate rotor shaft position signal 130 as part of step 202.

In step 204, the plurality of rotor blade acceleration signals 132, 134, 136 associated with the plurality of accelerations of the hub 20 is generated. For example, the first, second, and third accelerometers 104, 106, 108 may generate the plurality of hub acceleration signals 132, 134, 136.

In step 206, the phase adjustment is determined based on one the plurality of hub acceleration signals 132, 134, 136 or the predetermined correction factor 156. For example, the controller 112 determines the phase adjustment based on the plurality of hub acceleration signals 132, 134, 136 when the controller 112 receives the plurality hub acceleration signals 132, 134, 136. Conversely, the controller 112 determines the phase adjustment based on predetermined correction factor 156 when the controller 112 fails to receive the plurality of hub acceleration signals 132, 134, 136.

In an exemplary embodiment, various steps may be performed to determine the phase adjustment based on the plurality of hub acceleration signals 132, 134, 136. More specifically, the incremental measured rotor shaft position signal 124 may be received, e.g., by the controller 112. The plurality of hub acceleration signals 132, 134, 136 may be received, e.g., by the controller 112. The rotating frame of reference rotor shaft acceleration of the rotor shaft 28 may be calculated based on the plurality of hub acceleration signals 132, 134, 136. For example, the controller 112 may execute the rotor shaft acceleration logic 138 to generate the first and second rotor shaft acceleration signals 140, 142, which are associated with the rotating frame of reference rotor shaft accelerations. The estimated fixed frame of reference rotor shaft acceleration of the rotor shaft 28 may be calculated based on the rotating frame of reference rotor shaft acceleration. For example, the controller 112 may execute the coordinate transformation logic 144 to generate the fixed reference frame rotor shaft acceleration signal 146 based on the first and second rotor shaft acceleration signals 140, 142. The estimated fixed frame of reference rotor shaft acceleration is filtered, e.g., using the optional filter 148. The phase adjustment is determined based on the estimated fixed frame of reference rotor shaft acceleration. For example, the controller 112 may execute the phase adjustment logic 150 to generate the phase adjustment signal 152 based on the estimated fixed frame of reference rotor shaft acceleration signal 146. Alternate embodiments of step 206 may include only some of the aforementioned steps and/or other steps.

In step 208, the measured rotor shaft position is adjusted by the phase adjustment to determine the estimated rotor shaft position of the rotor shaft 28. For example, the controller 112 may execute logic, such as the summation block 154, to adjust the measured rotor shaft position by the phase adjustment. Specifically, the controller 112 may sum the incrementally updated estimated position signal 128 and the phase adjustment signal 152 to generate the estimated rotor shaft position signal 122.

The method 200 may include additional steps in some embodiments. For example, the method 200 may include receiving the estimated rotor shaft position. For example, the phase locked loop logic 158 of the controller 112 may receive the estimated rotor shaft position signal 122 when the controller 112 receives the incremental measured rotor shaft position signal 124. The method 200 may also include determining the updated estimated rotor shaft position of the rotor shaft 28 based on the plurality of hub acceleration signals 132, 134, 136. For example, controller 112 may execute the phase locked loop logic 158 to generate the updated estimated rotor shaft position signal 160 based on the estimated rotor shaft position signal 122 and the plurality of hub acceleration signals 132, 134, 136. In some embodiments of the method 200, the estimated fixed frame of reference rotor shaft acceleration may be calculated from the plurality of hub acceleration signals 132, 134, 136 as discussed above and used when determining the updated estimated rotor shaft position.

As discussed in greater detail above, the system 100 and the method 200 disclosed herein determine the estimated rotor shaft position of the rotor shaft 28. In particular, the system 100 and method 200 include executing logic to determine the estimated rotor shaft position. Unlike conventional systems and methods, the system 100 and the method 200 use a phase adjustment used to adjust the measured rotor shaft position of the rotor shaft 28 as detected by the rotor shaft position sensor 102. In this respect, the estimated position determined by the system 100 and the method 200 is free from error associated with phase misalignment between the rotor shaft 28 and the rotor shaft position sensor 102. Furthermore, the system 100 and the method 200 introduce less noise into the estimated position than conventional systems and methods due to the use of the rotor shaft position sensor 102. As such, the estimated rotor shaft position determined by the system 100 and the method 200 is more accurate than estimated rotor shaft positions determined by conventional systems and methods.

The system 100 and the method 200 are discussed above in the context of determining the estimated position of the rotor shaft 28 of the wind turbine 10. Nevertheless, the system 100 and the method 200 may be used to determine the estimated position of other shafts in the wind turbine 10. Furthermore, the system 100 and the method 200 may be used to determine the estimated position of shafts in other rotary machines, such as gas turbines.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for determining an estimated rotor shaft position of a rotor shaft of a wind turbine, the method comprising:

generating, with a rotor shaft position sensor, a measured rotor shaft position signal associated with a measured rotor shaft position of the rotor shaft;

generating, with a plurality of accelerometers positioned in an axisymmetric arrangement, a plurality of rotor hub acceleration signals associated with a plurality of rotor hub accelerations of a rotor hub coupled to the rotor shaft;

determining, with a controller, a phase adjustment based on one of the plurality of rotor hub acceleration signals or a predetermined correction value; and adjusting, with the controller, the measured rotor shaft position by the phase adjustment to determine the estimated rotor shaft position of the rotor shaft of the wind turbine.

2. The method of claim 1, further comprising: determining, with the controller, the phase adjustment based on the plurality of rotor hub acceleration signals.

3. The method of claim 1, further comprising:

determining, with the controller, the phase adjustment based on the predetermined correction value when the controller does not receive the plurality of rotor hub acceleration signals from the plurality of accelerometers.

4. The method of claim 1, further comprising:

receiving, with the controller, the measured rotor shaft position signal from the rotor shaft position sensor;

receiving, with the controller, the plurality of rotor hub acceleration signals from the plurality of accelerometers; and calculating, with the controller, a rotating frame of reference rotor shaft acceleration of the rotor shaft based on the plurality of rotor hub acceleration signals.

5. The method of claim 4, further comprising:

calculating, with the controller, an estimated fixed frame of reference rotor shaft acceleration of the rotor shaft based on the rotating frame of reference rotor shaft acceleration.

6. The method of claim 5, further comprising:

filtering the estimated fixed frame of reference rotor shaft acceleration with a filter.

7. The method of claim 5, further comprising:

determining, with the controller, the phase adjustment based on the estimated fixed frame of reference rotor shaft acceleration.

8. The method of claim 1, further comprising:

receiving, with a phase locked loop of the controller, the estimated rotor shaft position;

determining, with the phase locked loop of the controller, an updated estimated rotor shaft position of the rotor shaft based on the plurality of rotor hub acceleration signals.

9. The method of claim 1, further comprising:

calculating, with the controller, a rotating frame of reference rotor shaft acceleration of the rotor shaft based on the plurality of rotor hub acceleration signals;

calculating, with the controller, an estimated fixed frame of reference rotor shaft acceleration of the rotor shaft based on the rotating frame of reference rotor shaft acceleration; and determining, with a phase locked loop of the controller, an updated estimated rotor shaft position of the rotor shaft based on the estimated fixed frame of reference rotor shaft acceleration.

10. A system for determining an estimated rotor shaft position of a rotor shaft of a wind turbine, the system comprising:

a rotor hub coupled to the rotor shaft and a plurality of rotor blades;

a rotor shaft position sensor operatively coupled to the rotor shaft for detecting a measured rotor shaft position of the rotor shaft and generating a measured rotor shaft position signal associated with the measured rotor shaft position;

a plurality of accelerometers operatively coupled to the rotor hub and positioned in an axisymmetric arrangement about the rotor shaft, the plurality of accelerometers measuring a plurality of rotor hub accelerations of the plurality of rotor blades and generating a plurality of rotor hub acceleration signals associated with the plurality of rotor hub accelerations; and a controller communicatively coupled to the rotor shaft position sensor and the plurality of accelerometers, the controller configured to:

determine a phase adjustment based on one of the plurality of rotor hub acceleration signals or a predetermined correction value; and adjust the measured rotor shaft position by the phase adjustment to determine the estimated rotor shaft position of the rotor shaft of the wind turbine.

11. The system of claim 10, wherein the controller is configured to determine the phase adjustment based on the plurality of rotor hub acceleration signals.

12. The system of claim 10, wherein the controller is configured to determine the phase adjustment based on the predetermined correction value when the controller does not receive the plurality of rotor hub acceleration signals from the plurality of accelerometers.

13. The system of claim 10, wherein the controller is configured to:

receive the measured rotor shaft position signal from the rotor shaft position sensor;

receive the plurality of rotor hub acceleration signals from plurality of accelerometers; and calculate a rotating frame of reference rotor shaft acceleration of the rotor shaft based on the plurality of rotor hub acceleration signals.

14. The system of claim 13, wherein the controller is configured to calculate an estimated fixed frame of reference rotor shaft acceleration of the rotor shaft based on the rotating frame of reference rotor shaft acceleration.

15. The system of claim 14, further comprising:

a filter for filtering the estimated fixed frame of reference rotor shaft acceleration.

16. The system of claim 14, wherein the controller is configured to determine the phase adjustment based on the estimated fixed frame of reference rotor shaft acceleration.

17. The system of claim 10, wherein the controller comprises a phase locked loop configured to:

receive the estimated rotor shaft position when the controller does not receive the measured rotor shaft position signal from the rotor shaft position sensor; and determine an updated estimated rotor shaft position of the rotor shaft based on the plurality of rotor hub acceleration signals.

18. The system of claim 17, wherein the controller is configured to calculate a rotating frame of reference rotor shaft acceleration of the rotor shaft based on the plurality of rotor hub acceleration signals and to calculate an estimated fixed frame of reference rotor shaft acceleration of the rotor shaft based on the rotating frame of reference rotor shaft acceleration, and wherein the phase locked loop of the controller is configured to determine the updated estimated rotor shaft position of the rotor shaft based on the estimated fixed frame of reference rotor shaft acceleration.

19. A wind turbine, comprising:

a tower;

a nacelle mounted on the tower;

a rotor shaft at least partially positioned in the nacelle;

a rotor hub coupled to the rotor shaft;

a plurality of rotor blades coupled to the rotor hub;

a rotor shaft position sensor operatively coupled to the rotor shaft for detecting a measured rotor shaft position of the rotor shaft and generating a measured rotor shaft position signal associated with the measured rotor shaft position;

a plurality of accelerometers operatively coupled to the rotor hub and positioned in an axisymmetric arrangement about the rotor shaft, the plurality of accelerometers measuring a plurality of rotor hub accelerations of the rotor hub and generating a plurality of rotor hub acceleration signals associated with the plurality of rotor hub accelerations; and a controller communicatively coupled to the rotor shaft position sensor and the plurality of accelerometers, the controller configured to determine an estimated rotor shaft position of the rotor shaft based on the measured rotor shaft position signal and the plurality of rotor hub acceleration signals wherein the controller is configured to:

determine a phase adjustment based on one of the plurality of rotor hub acceleration signals or a predetermined correction value; and adjust the measured rotor shaft position by the phase adjustment to determine the estimated rotor shaft position of the rotor shaft.

* * * * *